United States Patent
Stone

(12) 
(10) Patent No.: US 6,672,972 B1
(45) Date of Patent: Jan. 6, 2004

(54) INSTRUCTIONAL DEVICE FOR IMPROVING GOLF SKILLS

(76) Inventor: Robert Allen Stone, 512 Sierra Ridge Ct., Moore, SC (US) 29639

( * ) Notice: Subject to any disclaimer, the term of this patent is extended or adjusted under 35 U.S.C. 154(b) by 8 days.

(21) Appl. No.: 10/047,494

(22) Filed: Jan. 14, 2002

(51) Int. Cl.[7] .............................. A63B 69/36; F21L 7/60
(52) U.S. Cl. ...................... 473/207; 473/209; 362/191
(58) Field of Search .................. 473/207, 208, 473/210, 211, 212, 215, 220, 221, 209, 223, 268; 362/259, 190, 191, 116, 287, 427, 396, 197, 105

(56) References Cited

U.S. PATENT DOCUMENTS

| | | | |
|---|---|---|---|
| 3,437,339 A | | 4/1969 | Starck |
| 3,826,502 A | | 7/1974 | Sorge |
| 4,079,940 A | * | 3/1978 | Arakaki ...................... 473/210 |
| 4,406,040 A | | 9/1983 | Cannone |
| 4,967,323 A | * | 10/1990 | Johnson et al. ............. 362/103 |
| 4,971,325 A | | 11/1990 | Lipps |
| 5,067,717 A | | 11/1991 | Harlan et al. |
| 5,284,345 A | | 2/1994 | Jehn |
| 5,343,376 A | * | 8/1994 | Huang ........................ 362/259 |
| 5,448,459 A | * | 9/1995 | Rogers ....................... 362/191 |
| 5,467,992 A | | 11/1995 | Harkness |
| 5,558,585 A | | 9/1996 | Nolan, Jr. |
| 5,738,595 A | | 4/1998 | Carney |
| 5,800,278 A | | 9/1998 | Varriano |
| 5,845,985 A | * | 12/1998 | Xiong et al. ................ 362/118 |
| 5,879,239 A | | 3/1999 | Macroglou |
| 5,897,200 A | * | 4/1999 | Ho ............................... 362/259 |
| 5,993,026 A | * | 11/1999 | Wu ............................. 362/259 |
| 6,024,467 A | * | 2/2000 | Liu ............................. 362/259 |
| 6,070,992 A | * | 6/2000 | Schnell ....................... 362/259 |
| 6,334,692 B1 | * | 1/2002 | Hsueh ......................... 362/116 |
| 6,431,720 B1 | * | 8/2002 | Cheng ......................... 362/118 |
| 6,439,734 B1 | * | 8/2002 | Lo ............................... 362/118 |
| 6,467,929 B2 | * | 10/2002 | Lee ............................. 362/191 |
| 6,471,064 B2 | * | 10/2002 | Gordon ....................... 206/534 |

* cited by examiner

*Primary Examiner*—Paul T. Sewell
*Assistant Examiner*—Nini F. Legesse
(74) *Attorney, Agent, or Firm*—Dority & Manning, P.A.

(57) ABSTRACT

A small laser pointer is connected to a gripping member by a free-swinging connection member so that when the gripping member is attached to a golfer's cap, golf visor or sunglasses, the laser pointer plumbs straight down under the influence of the gravitational force. Because of the free-swinging connection member, the laser pointer can swing as a pendulum through the full 360° of motion in a horizontal plane. The point of light that is projected by the laser pointer onto the ground provides the golfer with instant feed back if the golfer's head moves during the putting stroke, as the point of light created by the laser will also move when the head moves. The point of light from the laser also provides a point of reference that allows the golfer to set the golfer's eyes directly over the ball. At this location, the golfer is ensured of seeing the line of the putt better and is able to line up the putter head more precisely. The device can be used with or without a ball and enables the golfer to develop a steady head and perfect ball position, even without practicing with a ball.

2 Claims, 2 Drawing Sheets

INSTRUCTIONAL DEVICE FOR IMPROVING GOLF SKILLS

BACKGROUND OF THE INVENTION

The present invention relates to an instructional device for improving golfing skills and more particularly to such a device that employs a laser beam.

Numerous devices have been developed for assisting in the training of golfers to improve in various aspects of the game of golf. Many of these devices require special implements rather than the golfer's own clubs or require attachments to the golfer's clubs. In each case, the devices themselves interfere with the way the golfer normally uses the clubs in the absence of such devices and so does not provide useful feedback for the golfer's normal swing and/or stroke.

Another class of training devices avoids encumbering the golfer's club with attachments, but requires the golfer to wear one or more devices, either on the golfer's clothing or on portions of the golfer's body. One such device is shown in U.S. Pat. No. 5,879,239 to Macroglou. Not only must the golfer wear a special pair of glasses encumbered with various devices not normally found on glasses, but the devices divert the golfer's concentration to an image in a mirror disposed in front of the glasses during the golfer's putting stroke. Devices such as those disclosed in U.S. Pat. No. 3,437,339 to Starck and U.S. Pat. No. 5,284,345 to Jehn attach to the peak of the golfer's hat. Like the device in the Macroglou patent, the device in the Starck patent diverts the golfer's vision to a field of view that detracts from the observation of the ball target during the golfer's swing. While the device in the Jehn aims a laser beam on the ball, it requires considerable adjustment and aiming of the laser indicator prior to undertaking the golfer's swing in order to project the laser beam onto the golf ball that is to be hit by the golfer.

Because the device in Jehn only allows the laser to pivot in a single plane, extensive pre-configuration of the device is required before the user addresses the ball. Such pre-configuration includes positioning the device on the golfer's cap at a particular location, which depends on the way that the golfer wears the cap and how the golfer positions the head while addressing the ball. Once the location of the device on the cap is chosen, then such pre-configuration further includes the aiming of the laser. When attempting to aim the laser, it further may be found necessary to re-adjust the location of the device on the cap in order to get the laser to shine on the desired target because the laser is only capable of pivoting in a single plane.

OBJECTS AND SUMMARY OF THE INVENTION

It is a principal object of the present invention to provide an instructional device for improving golfing skills wherein the device does not encumber the golf club.

It is another principal object of the present invention to provide an instructional device for improving golf putting skills wherein the device is unobtrusive to the user and does not interfere with the user's normal stroke.

It is yet another principal object of the present invention to provide an instructional device for improving golf putting skills that alerts the user to undesirable head movement without diverting the user's attention from the normal ball target and without requiring extensive pre-location of the device prior to addressing the ball.

It is still another principal object of the present invention to provide an instructional device for improving golf putting skills wherein the user need not engage in precise or extensive preconfiguring of the device prior to its effective usage.

It is a further principal object of the present invention to provide an instructional device for improving the ability of the golfer to see the line of a putt and line up the putter head more precisely by permitting the user to set the golfer's eye directly over the ball prior to the putting stroke.

It is yet an additional object of the present invention to provide an instructional device that enables a golfer to develop a steady head and optimum ball position without practicing with a ball and wherein the device is unobtrusive to the user, does not interfere with the user's normal stroke, and does not require the user to engage in precise or extensive preconfiguring of the device prior to its effective usage.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a small laser pointer is connected to a gripping member by a free-swinging connection member so that when the gripping member is attached to a golfer's cap, golf visor or sunglasses, the laser plumbs straight down under the influence of the gravitational force. Because of the free-swinging connection member, the laser pointer can swing as a pendulum through the full 360° of motion in a horizontal plane. The laser pointer includes a light source and a power source that is electrically connected to the light source, which is disposed at one end of the pointer and configured for emitting a low power, concentrated light beam in the visible spectrum. The laser pointer also includes an electrical switch that is electrically connected between the light source and the power source and is configured to permit the golfer to selectively govern operation of the light source. The point of light that is projected by the laser onto the ground provides the golfer with instant feed back if the golfer's head moves during the putting stroke, as the point of light created by the laser will also move when the head moves. The point of light from the laser also provides a point of reference that allows the golfer to set the golfer's eyes directly over the ball. At this location, the golfer is ensured of seeing the line of the putt better and is able to line up the putter head more precisely. The device can be used with or without a ball and enables the golfer to develop a steady head and perfect ball position, even without practicing with a ball.

The accompanying drawings, which are incorporated in and constitute a part of this specification, illustrate a presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
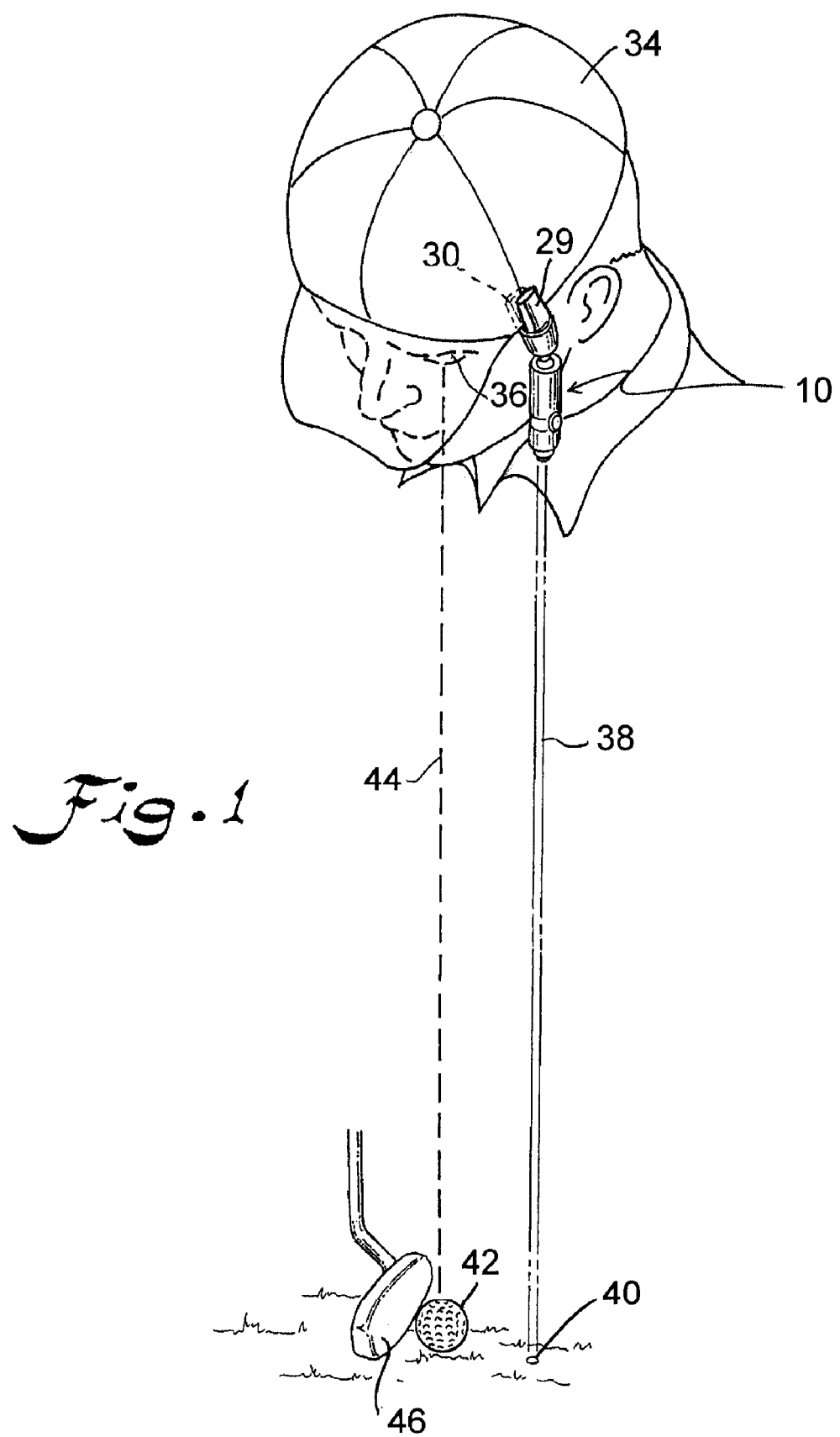
FIG. 1 is an elevated perspective view of a presently preferred embodiment of the invention illustrating its use in practice.

A presently preferred embodiment of the device for improving one's golf putting technique is shown in FIG. 1 and is designated generally by the numeral 10.

Figure 2:
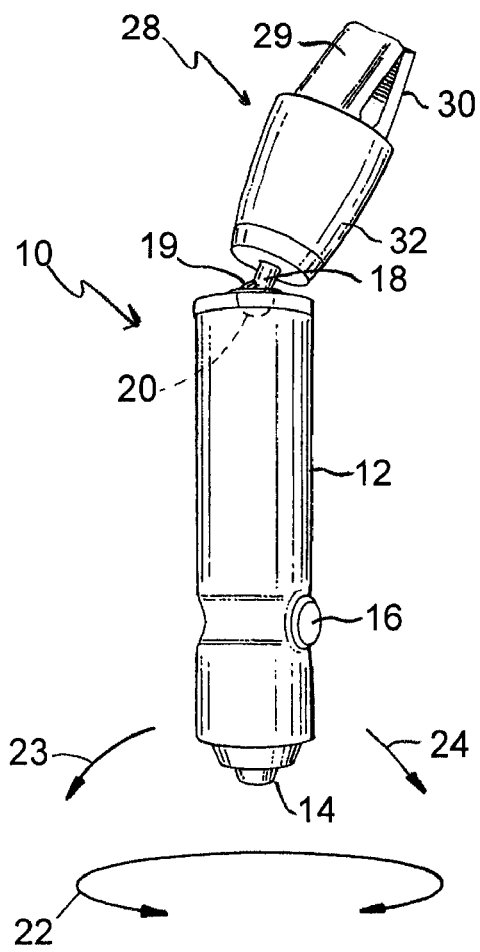
FIG. 2 is a presently preferred embodiment of the invention shown in an elevated perspective view.
Figure 3:
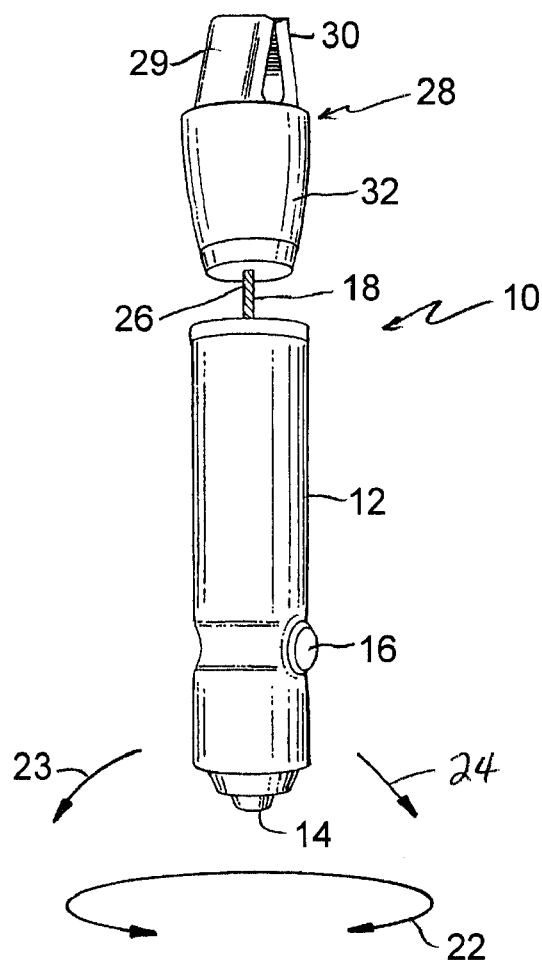
FIG. 3 is an alternative preferred embodiment of the present invention shown in an elevated perspective view.

As shown in FIGS. 2 and 3 for example, the device includes a small laser pointer 12. Such laser pointers include a light source disposed at one end of the pointer. Such laser pointers are conventional and readily available in sizes that render them sufficiently unobtrusive to be suitable for use in the present invention. As is conventional, such small laser pointers are configured for emitting a low power, concentrated light beam in the visible spectrum. The light beam can be generated desirably by a light source such as a light-emitting diode. As shown in FIGS. 2 and 3 for example, the light can be focused by a lens 14 disposed at the front of the laser pointer 12. The light source is energized by a power source that is electrically connected to the light source. The power source is desirably a portable power source such as a battery.

As shown in FIGS. 2 and 3 for example, an electrical switch has an on/off button 16 that is disposed on the outside of the body of the laser pointer 12 and is configured to permit the golfer to selectively govern operation of the light source. Depressing the button 16 turns on the laser pointer 12. Depressing the button 16 a second time, turns off the laser pointer 12. The electrical switch is electrically connected between the light source and the power source. The light emitting diode, battery and internal structure of the electrical switch and electrical connections are shielded from view within the body of the laser pointer 12 and are all of conventional construction, the details of which not being crucial to an understanding of the present invention.

In accordance with the present invention, the device 10 includes a connection member 18 that has a first end and a second end that is disposed generally opposite the first end. The first end of the connection member is connected to the laser pointer 12 at a location other than the location where the laser pointer emits the light beam. As shown in FIGS. 2 and 3 for example, the connection member 18 is connected at the opposite end of the laser pointer from the location where the light beam is emitted from the laser pointer. As shown in FIG. 2 for example, the first end of the connection member 18 is part of a ball-and-socket swivel 19, 20. Specifically, the first end of the connection member 18 is a ball 19 that is rotatably received in a socket 20 that is configured in the laser pointer 12 at the location that is other than where the laser pointer emits the light beam. The connection member 18 is thus rendered free-swinging and is therefore configured so that the one end of the pointer 12 from which the light beam is emitted is free to rotate in a circular 360° movement in a horizontal plane, which is indicated schematically in FIGS. 2 and 3 by the loop that is designated by the numeral 22. The separate arrows designated by the numerals 23 and 24 indicate a pendulum-type movement of laser pointer 12 in a vertical plane for example. Thus, the free-swinging connection member 18 enables the laser pointer 12 to move in any number of horizontal planes such as the one designated schematically by the loop 22 and any number of vertical planes such as the ones designated schematically by the arrows labeled 23, 24.

In an alternative embodiment shown in FIG. 3 for example, the connection member is a tether 26. This tether 26 desirably can be formed as a cord that is composed of a fibrous material, whether man-made or natural fibers. The tether 26 is flexible and can fold back upon itself. The tether 26 also can be formed of a small-link chain that can be composed of material that is metallic or synthetic such as carbon fiber.

The device also desirably includes a gripping member that is configured to be selectively attached to an article of the golfer's attire. As shown in FIGS. 2 and 3 for example, the gripping member 28 can be provided by a spring-loaded clip having a pair of rigid jaws 29, 30 that are biased to pinch together by a biasing member such as a spring mechanism, which is hidden from view by a flexible elastomeric sheath 32 through which the connection member 18 extends. In this way, the gripping member 28 is connected to the second end of the connection member 18. When the gripping member 28 is attached to the article of the golfer's attire such the side edge of the golfer's cap 34 as shown in FIG. 1 for example, the free-swinging attribute of the connection member 18 enables the pointer 12 to move in all directions in the horizontal plane that is defined transverse to the vertical direction, which is the direction in which the laser pointer 12 would plumb straight down under the influence of the gravitational force when the golfer's head was held still. This usually eliminates any need for repeated repositioning of the device 10 on the attire of the golfer.

In operation, the gripping member 28 is clipped to the edge of the golfer's cap 34 that is directly beside the golfer's lead eye 36. The gripping member 28 can just as easily be attached to the golfer's visor or sunglasses for example. One of the jaws 29, 30 of the gripping member 28 would be disposed to each opposite side of the edge of the golfer's cap 34 as shown schematically in FIG. 1 for example, regardless of exactly where the gripping member is attached to the cap 34. Because of the freeswinging attribute of the connection member 18, the laser pointer 12 plumbs straight down from the clip 28 as shown in FIG. 1 for example, and the light that is emitted from the light source in the laser pointer 12 projects in a concentrated beam that is indicated in FIG. 1 by the chain-dashed parallel lines designated by the numeral 38. The beam 38 projects a circular spot 40 on the ground, and the spot 40 is colored with the color of the light that is emitted by the light source. In a typical laser pointer 12, this light is in the red portion of the visible spectrum.

The golfer then can adjust the golfer's eye position to ensure that the spot 40 created by the laser is approximately one inch in front of and in line with the golf ball 42, the line of sight to the golf ball 42 being indicated by the dashed line designated 44 in FIG. 1. Thus, as the golfer sets up the blade 46 of the putter to address the ball 42, the space between the ball 42 and the spot 40 projected by the laser beam 38 defines the direction that is the line of the putt.

The spot 40 projected by the laser beam 38 enables the golfer to set the golfer's lead 36 eye directly over the ball 42 and observe the line of the putt better than otherwise would be possible. This in turn enables the golfer to line up the blade 46 of the putter more precisely and sets the golf ball 42 off the lead eye position, which is the desired position for making a proper putting stroke. Such a stroke generates over-spin that makes the ball 42 roll more consistently. Because of the free-swinging attribute of the connection member 18, if the head of the golfer moves in any direction, the spot 40 created by the laser beam 38 on the ground will move with the head movement. Thus, if the golfer's head moves during the execution of the putting stroke, that fact will become immediately apparent to the golfer by the movement of the spot 40 created by the laser beam 38 on the ground. Since less head movement has been equated by golfing professionals with a better putting stroke, the golfer obtains feedback that enables the golfer to make the putting stroke without moving the golfer's head.

The small size of the device 10 renders it relatively unobtrusive even when it is clipped directly beside the golfer's lead eye 36. Moreover, the ability of the device 10 to be located so close to the lead eye 36 of the golfer places the spot 40 projected by the laser beam 38 directly within the immediate view of the golfer when the golfer looks at the golf ball 42 just prior to swinging the putter to execute the golfing stroke.

With the aid of the golf training device of the present invention, the golfer can practice the putting stroke on surfaces other than a golf putting green. This would include various floor surfaces in the golfer's home or office for example. Using the golf training device 10 of the present invention, the golfer is assisted in developing a steady head during the execution of the putting stroke. The golfer also is trained to assume a perfect ball position, and this can be done even without the presence of a golf ball 42.

While a preferred embodiment of the invention has been described using specific terms, such description is for illustrative purposes only, and it is to be understood that changes and variations may be made without departing from the spirit or scope of the following claims.

What is claimed is:

1. A device for improving a golfer's putting technique, comprising:
    a small laser pointer including a light source disposed at one end of said pointer and configured for emitting a low power, concentrated light beam in the visible spectrum, a power source electrically connected to said light source, and an electrical switch electrically connected between said light source and said power source and configured to permit the golfer to selectively govern operation of the light source;
    a free-swinging connection member having a first end and a second end disposed generally opposite said first end, said first end being connected to said pointer at a location other than said one end of said pointer and wherein said second end of said connection member is part of a ball-and-socket swivel;
    a gripping member configured to be selectively attached to an article of the golfer's attire, said gripping member being connected to said second end of said connection member; and,
    wherein said ball-and-socket swivel connection member is configured so that said one end of said pointer is free to swivel 360 degrees. in a horizontal plane when said gripping member is attached to the article of the golfer's attire.

2. A device for improving a golfer's putting technique, comprising:
    a small laser pointer including a light source disposed at one end of said pointer and configured for emitting a low power, concentrated light beam in the visible spectrum, a power source electrically connected to said light source, and an electrical switch electrically connected between said light source and said power source and configured to permit the golfer to selectively govern operation of the light source;
    a free-swinging connection member having a first end and a second end disposed generally opposite said first end, said first end being connected to said pointer at a location other than said one end of said pointer, said second end of said connection member comprising part of a ball-and-socket swivel wherein said ball-and-socket swivel connection member is configured so that said one end of said pointer is free to swivel 360 degrees;
    a spring-loaded clip having a rear end configured as part of said ball-and-socket swivel connected to said second end of said connection member; and
    wherein said ball and socket swivel connection member and said clip are configured so that said one end of said pointer is free to swivel 360 degrees in a horizontal plane when said gripping member is attached to the article of the golfer's attire.

\* \* \* \* \*